United States Patent [19]

Saupe et al.

[11] Patent Number: 5,315,419
[45] Date of Patent: May 24, 1994

[54] METHOD OF PRODUCING A HOMOGENEOUSLY ALIGNED CHIRAL SMECTIC C LIQUID CRYSTAL HAVING HOMEOTROPIC ALIGNMENT LAYERS

[75] Inventors: Alfred Saupe; Antal Jakli, both of Kent, Ohio

[73] Assignee: Kent State University, Kent, Ohio

[21] Appl. No.: 918,918

[22] Filed: Jul. 23, 1992

Related U.S. Application Data

[63] Continuation-in-part of Ser. No. 885,180, May 19, 1992, abandoned.

[51] Int. Cl.$^5$ .................. G02F 1/13; G02F 1/137; G02F 1/1337
[52] U.S. Cl. .................. 359/46; 359/77; 359/78; 359/100
[58] Field of Search .................. 359/46, 56, 77, 78, 359/100

[56] References Cited

U.S. PATENT DOCUMENTS

| | | | |
|---|---|---|---|
| 3,796,999 | 3/1974 | Kahn | 359/45 |
| 4,221,471 | 9/1980 | Gurtler | 359/46 |
| 4,367,924 | 1/1983 | Clark et al. | 359/100 |
| 5,227,905 | 7/1993 | Clark et al. | 359/56 |

FOREIGN PATENT DOCUMENTS

| | | | |
|---|---|---|---|
| 2748738 | 5/1979 | Fed. Rep. of Germany | 359/46 |
| 64-11232 | 1/1989 | Japan | 359/78 |

OTHER PUBLICATIONS

Scudieri et al., "Different Roll Regimes in Shear-Excited NLC", J. Appl. Phys., vol. 49, No. 3, Mar. 1978, pp. 1289-1290.

Bos, Applications of Smectic Liquid Crystals, in Practical Liquid Crystals Lecture Notes, vol. II, (Kent State University, May 30, 1990), pp. 4-1 to 4-31.

Clark et al., "Submicrosecond Bistable Electro-Optic Switching in Liquid Crystals", Appl. Phys. Lett., vol. 36, No. 11, 1980, pp. 899-901.

Kahn, "IR-Laser, Addressed Thermo-Optic Smectic Liquid Crystal Storage Displays", Appl. Phys. Lett., vol. 22, No. 3, 1973, pp. 111-113.

*Primary Examiner*—William L. Sikes
*Assistant Examiner*—Ron Trice
*Attorney, Agent, or Firm*—Watts, Hoffmann, Fisher & Heinke

[57] ABSTRACT

A method for promoting uniform "bookshelf" textures in light modulators using smectic C* liquid crystal is disclosed. The method comprises the steps of confining smectic C* phase liquid crystal between parallel substrates having inner surfaces treated to promote homeotropic alignment of the liquid crystal near the inner surfaces, generating an electric field normal to the inner surfaces of the substrates and biasing the liquid crystal in a direction parallel to the inner surfaces of the substrates to induce the formation of smectic layers normal to the inner surfaces of the substrate. For example, the perturbation may be carried out by supplying a cyclic shear to one of the substrates or by means of a magnetic field parallel to the substrates. Reversal of the polarity of the electric field switches the material between two stable bookshelf textures. These textures are homogeneous in alignment even near the inner surfaces of the substrates, and the anchoring of the molecules near the substrates changes as the material is switched between bookshelf textures.

8 Claims, 2 Drawing Sheets

METHOD OF PRODUCING A HOMOGENEOUSLY ALIGNED CHIRAL SMECTIC C LIQUID CRYSTAL HAVING HOMEOTROPIC ALIGNMENT LAYERS

STATEMENT OF GOVERNMENT INTEREST

The invention described herein was made in the performance of work under Cooperative Agreement No. DMR 89-20147 awarded by the National Science Foundation. The Government has certain rights in this invention.

This application is a continuation-in-part of U.S. patent application Ser. No. 07/885,180, filed May 19, 1992, now abandoned.

TECHNICAL FIELD

This invention relates generally to liquid crystal technology, and more specifically to a method for promoting uniform "bookshelf" textures in light modulators using smectic C* liquid crystal.

BACKGROUND ART

A number of transmissive mode displays using smectic C* phase liquid crystal have been proposed. Molecules of a liquid crystal having a smectic C* phase are elongated and chiral. Smectic C* phases are characterized in that the molecules align in layers with their molecular directors oblique with respect to the layers. The tilt directions are twisted with respect to one another, so that the directors trace the surface of a cone. Smectic C* materials are "ferroelectric" in that the electrical polarization of the liquid crystal may be realigned with an electric field and remains stable in thin films once the field is removed.

"Surface-stabilized ferroelectric liquid crystal" ["SSFLC"] displays make use of thin films of smectic C* liquid crystal confined between substrates. In one proposed device of this type, the liquid crystal is confined between substrates which are placed between crossed optical polarizers. Preferably, the liquid crystal is aligned in a so-called "bookshelf" texture in which the molecules are arranged in layers perpendicular to the inner surfaces of the substrates and the molecular directors are approximately parallel along a line normal to the layers. If the film is sufficiently thin, the bookshelf texture should be stable when an electric field is removed. The material may be switched between two stable bookshelf textures by generating external electric fields across the liquid crystal normal to the inner surfaces of the substrates. The field useful for switching the material from one texture to the other is opposite in polarity to the field useful for switching back to the first of the textures. The two stable bookshelf textures are similar to each other in that the molecular directors are aligned homogeneously, but differ in that the molecular directors in the two textures form mirror images about a plane normal to the layers and to the inner surfaces of the substrates.

SSFLC displays modulate light by controlling the polarization direction of linearly polarized light transmitted through the liquid crystal. Due to the birefringence of the liquid crystal, the component of light incident on the liquid crystal is decomposed into two components of different speeds which change the polarization dependent on the thickness of the liquid crystal material. In an SSFLC display, the upstream polarizer is aligned so that the polarization direction of light incident on the liquid crystal is parallel or perpendicular to the molecular directors in a first of the two stable bookshelf textures; in this texture, the incident polarized light is transmitted without change of the polarization direction by the liquid crystal and is consequently blocked by the downstream analyzer. In addition, the thickness of the liquid crystal layer is selected to effect a 90° rotation of the polarization direction of the polarized light incident on the liquid crystal when the liquid crystal is in the second of the two stable bookshelf textures, so that the polarized light transmitted by the liquid crystal in this second texture is transmitted by the analyzer. Consequently, the SSFLC display is dark when the liquid crystal is in the first of the stable bookshelf textures and bright when the liquid crystal is in the second of the two bookshelf textures.

Among the advantages attributed to displays using smectic C* liquid crystal are fast switching times, low switching voltage and high contrast compared to commercially available liquid crystal displays such as twisted nematic displays. In particular, displays using ferroelectric smectic C* liquid crystal may be capable of switching times on the order of microseconds.

One disadvantage of displays using smectic C* liquid crystals is the difficulty of obtaining stable bookshelf alignment of the liquid crystal. The layers of smectic C* materials confined between substrates have a tendency to undulate or twist, producing defects which reduce the contrast. The liquid crystal is usually aligned on cooling from a high temperature using a surface coating which promotes homogeneous alignment of the molecules near the coating. This method gives a good bookshelf texture at the high temperature limit of the smectic range (often a smectic A phase). Due to the temperature dependence of the layer thickness, however, the layers generally form defects on further cooling. Quasi-bookshelf textures can be obtained by the use of certain napthalene derivatives, for which the layer tilt is only about 5° at room temperature. Furthermore, the use of surface coatings which promote homogeneous alignment in order to induce a bookshelf texture significantly increases the switching voltage required to switch between stable textures. Despite intense research over the past decade, there remains a need for method of aligning smectic C* liquid crystal in a stable bookshelf alignment capable of low voltage switching. In particular, there is a need for a method to align the films in the finished display.

BRIEF DESCRIPTION OF THE INVENTION

A method for producing a ferroelectric liquid crystal film comprises the steps of confining smectic C* phase liquid crystal between parallel substrates having inner surfaces treated to promote homeotropic alignment of the liquid crystal near the inner surfaces, generating an electric field normal to the inner surfaces of the substrates and biasing the liquid crystal in a direction parallel to the inner surfaces of the substrates to induce the formation of smectic layers normal to the inner surfaces of the substrate. It has been found that the resulting material will have a bookshelf texture with homogeneous alignment near the inner surfaces of the substrate despite the treatment of those surfaces to promote homeotropic alignment. As is known in the art, the bookshelf texture will be stable if the liquid crystal film is sufficiently thin.

By reversing the polarity of the field, the liquid crystal may be switched to a second bookshelf texture to provide light modulation between crossed polarizers. It appears that the anchoring of the molecules near the substrate is weak and that the anchoring undergoes a transition when the material switches between two such bookshelf textures. The fact that the surface anchoring undergoes a transition when the texture is changed tends to increase the stability of the bookshelf textures.

According to one embodiment of the invention, the substrates are formed by depositing a layer of transparent electrode material and a layer of silane surface alignment material on glass plates so that the silane material defines inner surfaces for contact with the liquid crystal. The silane material aligns the liquid crystal initially in a homeotropic alignment with layers parallel to the inner surfaces of the substrates. A power supply is coupled to the transparent electrodes to supply a signal which generates an electric field through the liquid crystal. One of the substrates is then supplied with a cyclic shear. The combination of the electric field and the cyclic shear serve to realign the liquid crystal in a homogeneous bookshelf alignment, Alternatively, a DC electric field may be supplied across the liquid crystal normal to the inner surfaces of the substrates and a magnetic field may be supplied parallel to the substrates to induce realignment of the liquid crystal from a homeotropic alignment to a homogeneous bookshelf alignment.

Yet another embodiment realigns the liquid crystal from the homeotropic texture to the homogeneous bookshelf texture by realigning the liquid crystal starting near one end of the substrates and inducing the realignment to spread across the liquid crystal as a propagating front. For example, the propagation may be induced by a voltage step which is gradually swept across the sample. On one side of the step the voltage is above the threshold for the transition from the homeotropic to the bookshelf texture, on the other side zero or below the threshold. In the case of a matrix-addressed display, the voltage step may be generated and moved through the application of appropriate voltages on the scan lines of the display. Alternatively, a steep voltage gradient may be introduced across the material, and the DC level of the voltage steadily increased. The motion of the voltage step or the direction of the voltage gradient provides the bias which directs the liquid crystal in its homogeneous alignment.

Many additional features and advantages and a fuller understanding of the invention will be had from the following detailed description of preferred embodiments and the accompanying drawings.

DETAILED DESCRIPTION OF THE PREFERRED EMBODIMENT

Figure 1:
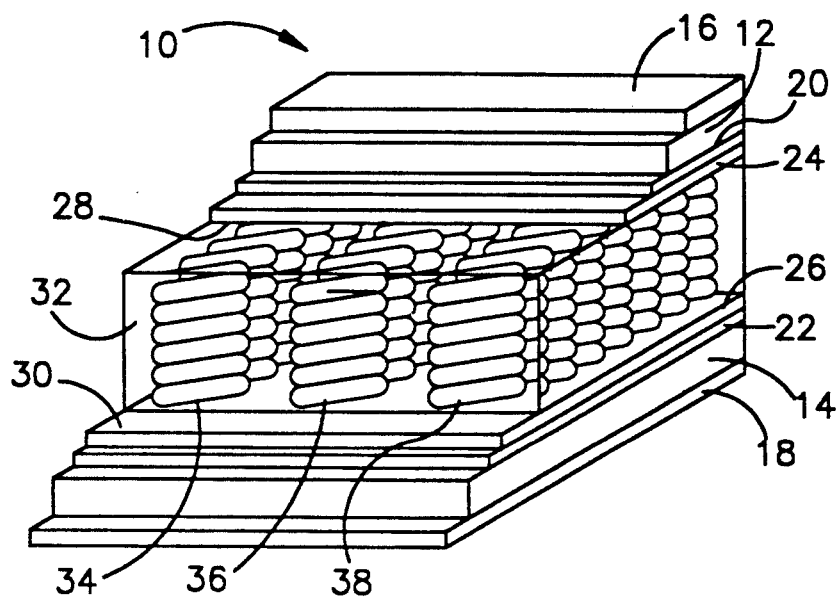
FIG. 1 is a schematic diagram of a light modulating device incorporating smectic C* liquid crystal in a bookshelf texture.

FIG. 1 schematically illustrates a light modulating device 10 incorporating smectic C* liquid crystal in a bookshelf texture. The device 10 includes a pair of substrates comprising glass plates 12, 14 which support polarizers 16, 18; transparent electrodes 20, 22 and surface alignment layers 24, 26. Confined between inner surfaces 28, 30 defined by the surface alignment layers 24, 26 is a smectic C* phase liquid crystal material with molecules aligned in layers 34, 36, 38. As illustrated in FIG. 1, the directors of the liquid crystal molecules are parallel to the inner surfaces 28, 30 of the substrates and aligned in layers with boundaries oblique to the molecular directors.

A method for producing a ferroelectric liquid crystal film comprises the steps of confining smectic C* phase liquid crystal between parallel substrates having inner surfaces treated to promote homeotropic alignment of the liquid crystal near the inner surfaces, generating an electric field normal to the inner surfaces of the substrates and perturbing the liquid crystal in a direction parallel to the inner surfaces of the substrates to induce the formation of smectic layers normal to the inner surfaces of the substrate. The first of these steps is illustrated schematically in FIG. 2. In the embodiment shown, the substrates are prepared by depositing electrode layers 20, 22 and surface alignment layers 24, 26 on glass plates 12, 14. The preferred electrode layers 20, 22 are composed of a transparent electrode material such as indium-tin oxide. The preferred surface alignment layers 24, 26 are composed of material such as a silane material which promotes homeotropic alignment of the liquid crystal directors as shown in FIG. 2.

Figure 2:
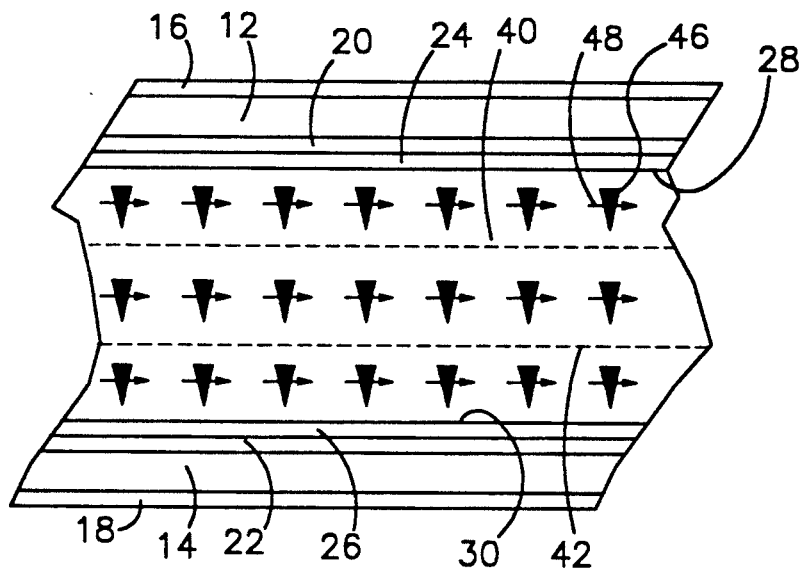
FIG. 2 is a schematic diagram of the light modulating device of FIG. 1 with the liquid crystal aligned homeotropically.

The homeotropically-aligned smectic C* liquid crystal illustrated in FIG. 2 is aligned in layers with boundaries 40, 42 parallel to the inner surfaces 28, 30 of the substrates. The molecular directors of the liquid crystal (shown schematically by 46) lie at an oblique angle with respect to the layer boundaries 40, 42. The permanent dipole moments of the molecules (shown schematically in projection by 48) lie at angles with respect to the directors. These permanent dipole moments 48 are capable of interacting with an external electric field to impose a torque tending to rotate the dipole moments 48 toward alignment with an external electric field.

Figure 3:
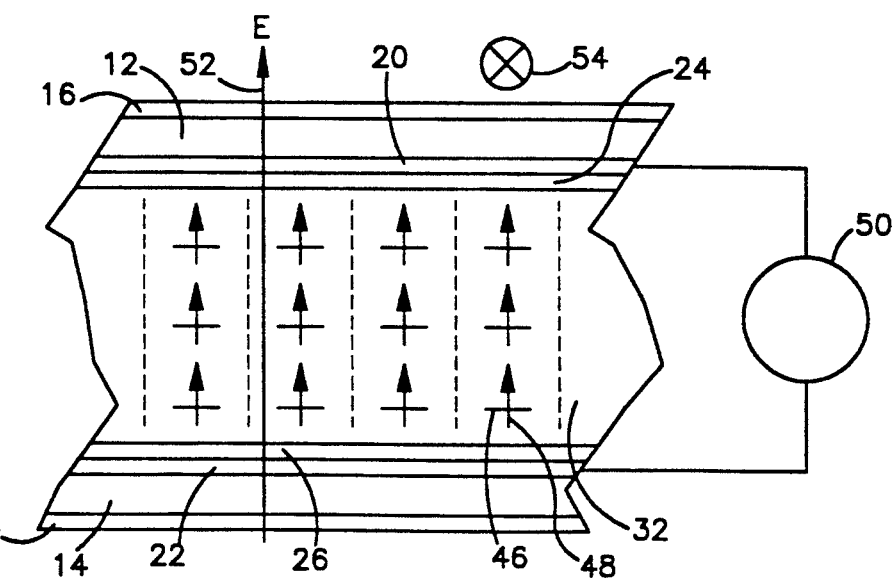
FIG. 3 is a schematic diagram illustrating the realignment of the liquid crystal of the device of FIG. 2 by means of an electric field and cyclic shear.
Figure 4:
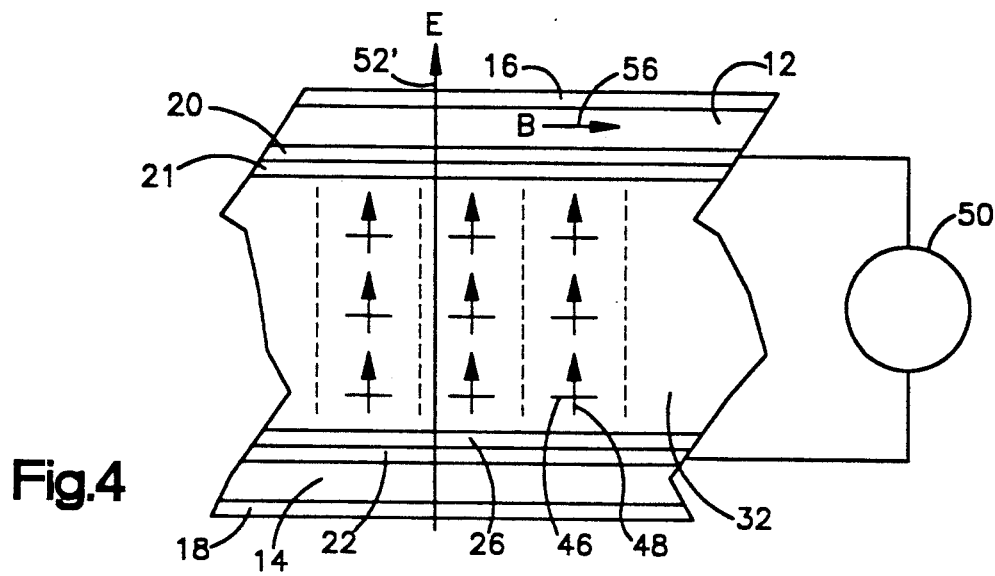
FIG. 4 is a schematic diagram illustrating the realignment of the liquid crystal of the device of FIG. 2 by means of an electric field and a perpendicular magnetic field.

Once the liquid crystal is aligned homeotropically as shown in FIG. 2, it can then be realigned in a bookshelf texture by means of an external electric field normal to the inner surfaces of the substrates, as illustrated in FIGS. 3 and 4. As shown the field is applied through the electrodes 20, 22 by means of a power supply 50 coupled to the electrodes. The field may be applied in either polarity normal to the substrates, and the direction of the field is indicated by 52 in FIG. 3 and 52' in FIG. 4. The field may be either DC, AC or a combination of both, but the strength of an AC field required to transform the liquid crystal into the bookshelf texture increases with increasing frequency.

Since the surface alignment layers 24 and 26 promote homeotropic alignment of the liquid crystal and the external electric field is likewise normal to the substrates, some bias must be supplied to the liquid crystal to define a preferred direction parallel to the substrates before the liquid crystal will realign homogeneously and assume a bookshelf texture. One technique for biasing the liquid crystal is to provide a cyclic (i.e., periodically reversing) shear to one of the substrates, thereby defining a preferred direction along the direction of shear (shown schematically by 54 in FIG. 3). Alternatively, an external magnetic field in a direction such as that shown at 56 in FIG. 4 may be used to orient the bookshelf layers, but an electric field with a DC component should be used if the liquid crystal is to be biased by a magnetic field in order to obtain a uniform bookshelf texture.

Figure 6:
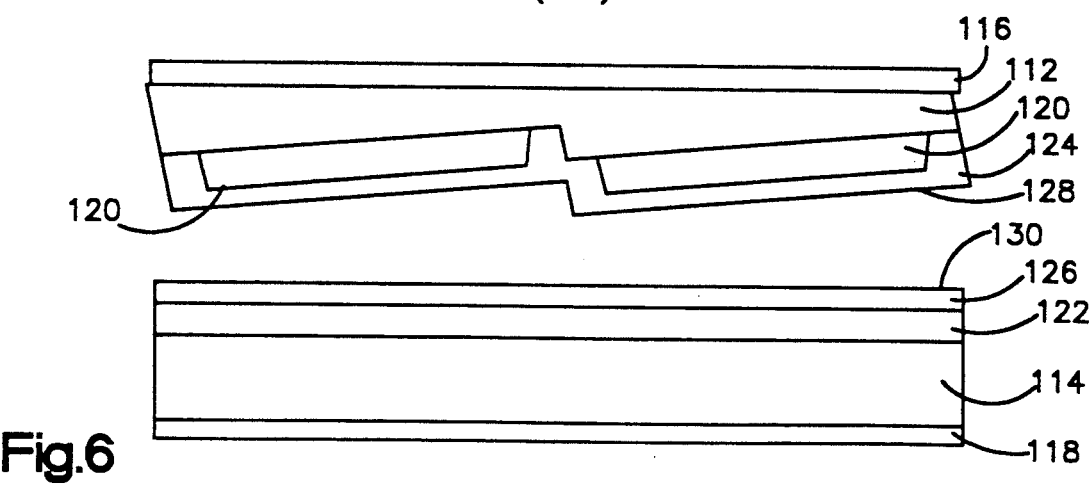
FIG. 6 is a schematic cross-sectional view of support structure for a light modulating device, including a substrate with a saw-tooth profile, for use in aligning smectic liquid crystal supported in the support structure by a propagating front due to an increasing electric field.

Yet another technique for biasing the liquid crystal is by means of an electric field gradient which induces bookshelf alignment at one end of each pixel and then causes the bookshelf alignment to propagate across the pixels. This method can be used to align the films of matrix displays in situ. It requires that one of the substrates has a grated surface so that there is a thickness gradient in each pixel. According to the embodiment shown in FIG. 6, the support structure for a light modulating device 110 includes a pair of substrates 112, 114, each supporting a polarizer 116, 118; electrodes 120, 122; and an alignment layer 124, 126. Smectic liquid crystal (not shown) is supported between inner surfaces 128, 130 of the alignment layers 124, 126.

One of the inner surfaces, 128, has a saw-tooth profile. Preferably, the typical period of the saw-tooth profile is on the order of 50–300 $\mu$m, which corresponds to the width of the pixels. The slope of the thickness gradient can be kept small so that the optical properties across a pixel do not change significantly. This saw-tooth profile may be formed using a substrate having an inner side with a saw-tooth profile and depositing the electrodes 120 and the alignment surface 124 on that inner side. The preferred electrodes 120 are elongated parallel to each other and to the "teeth" of the saw-tooth profile, in a direction normal to the view shown in FIG. 6. The preferred electrodes 122 are elongated in a direction parallel to each other and perpendicular to the electrodes 120, defining pixels where the electrodes cross in projection.

When a combination of an AC voltage and a DC ramp voltage are applied to the electrodes, electric field gradients are formed in the pixels parallel to the substrates 112, 114 due to the slope of the saw-tooth surface 128 relative to the flat surface 130. As the ramp voltage increases, a threshold electric field sweeps across each pixel. Bookshelf alignment begins at the thin edge of each pixel and propagates across the pixels as the threshold voltage sweeps across the cell.

The preferred embodiment of the invention is further exemplified by the following non-limiting examples:

EXAMPLE 1

In this example, the smectic C* phase comprised FLC 6430 liquid crystal supplied by Hoffman LaRoche. The FLC 6430 liquid crystal had a large polarization $P_S = 90$ nC/cm$^2$ and a short pitch length of 0.43 $\mu$m at room temperature. It also had a broad smectic C* temperature range from $-11°$ C. up to 59° C., and was in the smectic A phase between 59° C. and 65° C. At higher temperatures it was isotropic.

A 5 $\mu$m thick film of FLC 6430 liquid crystal material at elevated temperature was deposited on glass substrates coated with X1-6136 silane material supplied by Dow Corning. The liquid crystal material assumed a homeotropic alignment which remained undisturbed as the material cooled to room temperature. Due to the very small pitch the homeotropic texture was uniformly dark between crossed polarizers.

When an external electric field was applied to the homeotropically-aligned liquid crystal in a direction perpendicular to the substrates and at room temperature, no change was observed up to a threshold voltage $U_{th}$. This threshold voltage increased with increasing frequency. For example, $U_{th} = 19$ V for a DC field; $U_{th} = 38.5$ V for a frequency of 1 kHz; and $U_{th} = 57$ V for a frequency of 6 kHz. Above $U_{th}$ the homeotropic texture was unstable and birefringent areas grew typically from the edges or from defects. Once the transition was completed, a texture with the layers normal to the surface but otherwise random was formed.

EXAMPLE 2

When in addition to the applied voltage a uniform cyclic mechanical shear on the order of 1–10 Hertz (the frequency is not critical) with an amplitude of approximately 50 $\mu$m was supplied to the material display described in Example 1, the final texture was uniformly homogeneous over the entire area of the display. Due to the thickness of the material relative to the pitch length of the liquid crystal, the bookshelf texture was metastable. After removal of the field the texture remained practically homogeneous for a few minutes and then stripes growing from the defects parallel to the layers appeared due to the transition of the material into a homogeneous alignment with the directors of the layers twisted along a line normal to the layers. The rate at which the helical texture reformed was dependent on both the frequency and the amplitude of the voltage applied to align the material, with the number of nucleation sites for the reformation increasing with increasing frequency and amplitude. After a few hours the helical texture was almost complete and the stripe pattern disappeared because the pitch was smaller than the wavelengths of visible light.

The aligned sample could be switched electrically with fields on the order of 2 V/$\mu$m between two untwisted homogeneous states for which the directions of extinction differed by 53°, which is, within error limits, equal to twice the angle formed between the molecular director and a normal to the layers. When the voltage was removed, the untwisted states remained virtually unchanged until the helical texture reformed. This indicates that the material aligned in bookshelf textures in the electric field and that the surface anchoring switches between two metastable homogeneous textures with polarization up or down notwithstanding the silane surface alignment material.

Figure 5:
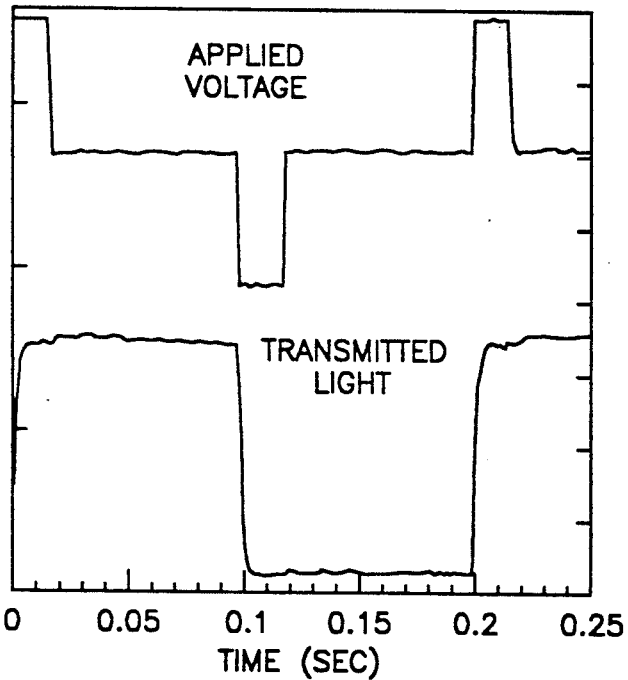
FIG. 5 is a timing diagram relating switching voltage and transmission for a material aligned in the bookshelf texture.

Short electric pulses were supplied to the liquid crystal material in a direction normal to the substrate. The material switched between two bookshelf textures on the rising edge of each pulse. The contrast of the display between the two bookshelf textures was approximately 80. A timing diagram relating the applied voltage and transmitted intensity is shown in FIG. 5.

EXAMPLE 3

A display was formed in a DC electric field with amplitude slightly higher than $U_{th}$ as in Examples 1 and 2, except that a magnetic field perpendicular to the DC field was used rather than a shear to bias the liquid crystal. The final texture was fairly homogeneous bookshelf with the optical axis in average parallel to the magnetic field and the smectic layers making an angle of 26° to the layer boundaries. The transition occurred in approximately 20 minutes.

EXAMPLE 4

A display was formed from a 5 μm thick film of SCE12 liquid crystal, which was supplied by BDH Chemical. The SCE12 liquid crystal had a median polarization $P_S = 17 nC/cm^2$ at room temperature. The pitch of SCE12 material is sufficiently large at room temperature that helix formation was suppressed by the surfaces for a sample of thickness 5 μm. As in the previous example, the liquid crystal was deposited between glass substrates coated with X2-6136 silane material at elevated temperature and assumed a homeotropic alignment as the material cooled to room temperature.

An external DC electric field in excess of 50 volts DC was applied to the homeotropically aligned liquid crystal in a direction perpendicular to the substrates. At the same time, a mechanical shear on the order of 1 Hz with an amplitude on the order of 50–100 μm was supplied. The material formed a bookshelf texture which was homogeneous over the entire area of the display (approximately 5 cm²). Unlike the previous example, no helix reformation occurred due to the larger helical pitch of SCE12 relative to the thickness of the film.

The aligned sample could be switched electrically with fields on the order of 3 volts/μm between two untwisted homogeneous textures for which the directions of extinction differed by 40°, which is, within error limits, twice the angle formed between the molecular director and a normal to the layers. When the voltage was removed, the untwisted textures remained unchanged indefinitely. The contrast of the display between the two textures was less than that of Examples 1 and 2.

EXAMPLE 5

A display was formed using a wedge-shaped sample of liquid crystal FLC 6430 formed between a pair of substrates mounting electrodes and alignment layers with flat inner surfaces. The wedge-shaped liquid crystal sample had a length of 1 cm and a film thickness varying linearly from 5 μm to 20 μm, which corresponds to a slope of $2 \times 10^{-3}$ rad. The thickness at the edges was set by polystyrene balls with diameters of 5 μm and 20 μm respectively. The electric field strength in the sample was inversely proportional to the sample thickness, so that uniform potentials on the surfaces of the substrates generated an electric field gradient parallel to the substrates.

A rectangular-wave AC field of 25 volts and a linear ramp voltage rising from 0 volt to 10 volts at a rate of 1 mV/sec were applied across the liquid crystal. A bookshelf texture formed at first along the thin (5 μm) edge and propagated with the layers parallel to the direction of growth toward to thicker (20 μm) edge. The texture was perfectly aligned up to a film thickness of 10 μm, that is, for the thinner third of the sample. At higher thicknesses the alignment was less perfect, probably because the gradient was smaller and the threshold boundary less was well defined. The uniform part of the film could be electrically switched between stable states with a voltage of 10 volts.

Many changes and modifications of the invention will be apparent to those skilled in the art in light of the foregoing detailed disclosure. Therefore, within the scope of the appended claims, it is to be understood that the invention can be practiced otherwise than as specifically shown and described.

We claim:

1. A method for producing a ferroelectric liquid crystal film comprising the steps of:
   a) confining smectic C* phase liquid crystal between parallel substrates having inner surfaces treated to promote homeotropic alignment of the liquid crystal near the inner surfaces;
   b) generating an electric field in the liquid crystal normal to the inner surfaces of the substrates; and
   c) biasing the liquid crystal in a direction parallel to the inner surfaces of the substrates to induce a realignment of the liquid crystal molecules into homogeneously aligned layers with boundaries perpendicular to the inner surfaces of the substrates.

2. A method according to claim 1 wherein the inner surfaces of the substrates are defined by a layer of silane material which promotes homeotropic alignment of the liquid crystal near the inner surfaces.

3. A method according to claim 1 wherein the substrates support transparent electrodes bounding the liquid crystal and the step of generating an electric field in the liquid crystal includes coupling electric signals to the transparent electrodes.

4. A method according to claim 1 wherein the step of biasing the liquid crystal includes supplying a cyclic shear to one of the substrates.

5. A method according to claim 1 wherein the step of generating an electric field in the liquid crystal includes generating a DC field, and wherein the step of biasing the liquid crystal includes generating a magnetic field in the liquid crystal parallel to the inner surfaces of the substrates.

6. A method according to claim 1 wherein the step of biasing the liquid crystal is accomplished by propagating a transition front.

7. A method according to claim 6 wherein the propagated front is produced by increasing an electric field that has a gradient parallel to an inner surface of the material.

8. A method according to claim 6 wherein the propagated front is produced by moving a step in an electric field across the film.

* * * * *